(12) United States Patent
Shin et al.

(10) Patent No.: US 10,081,708 B2
(45) Date of Patent: Sep. 25, 2018

(54) POLYCARBONATE COPOLYMER AND PREPARATION METHOD THEREFOR

(71) Applicant: SAMYANG CORPORATION, Seoul (KR)

(72) Inventors: Kyung Moo Shin, Daejeon (KR); So Ri Son, Gyeongsangbuk-do (KR); Mi Ran Kim, Daejeon (KR); Ji Eun Kim, Gyeongsangnam-do (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 15/537,562

(22) PCT Filed: Dec. 18, 2015

(86) PCT No.: PCT/KR2015/013913
§ 371 (c)(1),
(2) Date: Jun. 19, 2017

(87) PCT Pub. No.: WO2016/099185
PCT Pub. Date: Jun. 23, 2016

(65) Prior Publication Data
US 2018/0162994 A1 Jun. 14, 2018

(30) Foreign Application Priority Data

Dec. 19, 2014 (KR) .................. 10-2014-0184448

(51) Int. Cl.
| | | |
|---|---|---|
| C08G 64/30 | (2006.01) | |
| C08J 5/00 | (2006.01) | |
| C08G 64/38 | (2006.01) | |
| C08G 64/42 | (2006.01) | |
| C08L 69/00 | (2006.01) | |
| C08G 63/64 | (2006.01) | |

(52) U.S. Cl.
CPC .......... *C08G 64/307* (2013.01); *C08G 63/64* (2013.01); *C08G 64/305* (2013.01); *C08G 64/38* (2013.01); *C08G 64/42* (2013.01); *C08J 5/00* (2013.01); *C08L 69/00* (2013.01)

(58) Field of Classification Search
CPC ................................................ C08G 64/1608
USPC ............................................................ 528/206
See application file for complete search history.

(56) References Cited

U.S. PATENT DOCUMENTS

| | | | |
|---|---|---|---|
| 2,999,835 A | 9/1961 | Goldberg | ........................ 260/42 |
| 3,028,365 A | 4/1962 | Schnell et al. | .................. 260/47 |
| 3,153,008 A | 10/1964 | Fox | ................ 260/47 |
| 3,334,154 A | 8/1967 | Kim | ............................ 260/860 |
| 2010/0048855 A1 | 2/2010 | Kato et al. | ................... 528/201 |

FOREIGN PATENT DOCUMENTS

| | | | | |
|---|---|---|---|---|
| JP | 2011-105887 | 6/2011 | .......... | C08G 63/199 |
| KR | 10-2007-0037544 | 4/2007 | .............. | C08L 67/02 |
| KR | 10-0878451 | 1/2009 | .............. | C08G 64/20 |
| KR | 10-2009-0026757 | 3/2009 | .............. | C08G 64/30 |
| KR | 10-2013-0116376 | 10/2013 | .............. | B29B 13/10 |
| KR | 10-2014-0002230 | 1/2014 | .............. | C08G 64/04 |

OTHER PUBLICATIONS

International Search Report (ISR) dated Mar. 29, 2016 in PCT/KR2015/013913 published as WO 2016/099185.

*Primary Examiner* — Terressa Boykin
(74) *Attorney, Agent, or Firm* — Harness, Dickey & Pierce, P.L.C.

(57) ABSTRACT

The present invention relates to a polycarbonate copolymer and a preparation method therefor and, more specifically, to a polycarbonate copolymer comprising a fluorene ester oligomer and a polycarbonate as polymerization units, and a preparation method therefor.

10 Claims, No Drawings

POLYCARBONATE COPOLYMER AND PREPARATION METHOD THEREFOR

CROSS-REFERENCE TO RELATED APPLICATIONS

This application is a national phase application of PCT Application No. PCT/KR2015/013913, filed on Dec. 18, 2015, which claims priority to Korean Patent Application No. 10-2014-0184448, filed on Dec. 19, 2014. The entire disclosure of the applications identified in this paragraph is incorporated herein by reference.

FIELD

The present invention relates to a polycarbonate copolymer and method for preparing the same, and more specifically, a polycarbonate copolymer comprising a fluorene ester oligomer and a polycarbonate as polymerization units.

BACKGROUND ART

Compounds having a fluorene backbone such as 9,9-bis (4-hydroxyphenyl) fluorine, etc. show features of high refractive index and low double refraction, and thus they are expected to be used in application as optical material, etc. Such a compound having a fluorene backbone is concretely used as a polymerization component (diol component, etc.), and considered to be used by incorporating it directly into a polymer backbone, or adding it to a resin as an additive, or the like.

A fluorene polyester oligomer prepared by polymerizing, as starting materials, a diol having a fluorene backbone and a dicarboxylic dihalide has been conventionally disclosed (for instance, Japanese Patent No. 5466927). This prior art, however, discloses a preparation method by reacting a diol having a fluorene backbone and a dicarboxylic dihalide only.

Accordingly, it is required to develop a novel polycarbonate copolymer having good transmittance due to the feature of low double refraction and having good impact strength at the same time, and a method for preparing the same.

DETAILED DESCRIPTION OF THE INVENTION

Technical Purpose

To resolve the problems of prior arts as explained above, the present invention has an object of providing a polycarbonate copolymer showing features of high refractive index and low double refraction and having good impact strength and transmittance, and a method for preparing the same.

Technical Means

To achieve the above-stated object, the present invention provides a polycarbonate copolymer comprising, as polymerization units, a fluorene ester oligomer prepared from: a compound having a fluorene backbone selected from dicarboxylic compounds, dihalide compounds, dicyanide compounds and combinations thereof, and a dihydroxy compound; and a polycarbonate.

The other aspect of the present invention provides a method for preparing a polycarbonate copolymer, comprising the steps of: (1) polymerizing a fluorene ester oligomer by reacting a compound having a fluorene backbone selected from dicarboxylic compounds, dihalide compounds, dicyanide compounds and combinations thereof; and a dihydroxy compound; and (2) copolymerizing the fluorene ester oligomer obtained in said step (1) and a polycarbonate in the presence of a first polymerization catalyst.

Another aspect of the present invention provides a molded product comprising the polycarbonate copolymer.

Effect of the Invention

The novel polycarbonate copolymer according to the present invention shows features of high refractive index and low double refraction as compared with conventional compounds having a fluorene backbone, and has good impact strength and transmittance. Thus, it can be used very suitably for applications such as optical material, automotive part, etc.

Concrete Explanation To Carry Out The Invention

The present invention is explained in more detail below.

The polycarbonate copolymer of the present invention comprises, as polymerization units, a fluorene ester oligomer prepared from: a compound having a fluorene backbone selected from dicarboxylic compounds, dihalide compounds, dicyanide compounds and combinations thereof, and a dihydroxy compound; and a polycarbonate.

The compound having a fluorene backbone can be represented by the following formula 1:

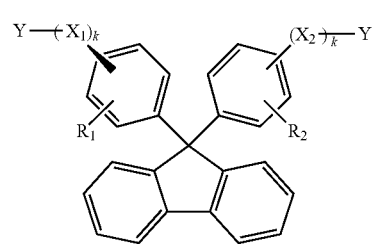

Formula 1 wherein, each of $R_1$ and $R_2$ is independently hydrogen, an alkyl group having 1 to 30 carbons, a cycloalkyl group having 3 to 30 carbons, or an aryl group having 6 to 30 carbons;

each of $X_1$ and $X_2$ is independently an alkylene group having 1 to 30 carbons, a cycloalkylene group having 3 to 30 carbons, an arylene group having 6 to 30 carbons, or

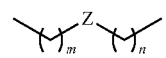

where Z is O, N, S or (C=O), and each of m and n is an integer of 0 to 30;

k is an integer of 0 to 5; and

Y is carboxylic group, acyl group, halogen group, carbonyl halide or isocyano group.

The dihydroxy compound, for example, can be selected from the group consisting of bis(4-hydroxyphenyl)methane, bis(4-hydroxyphenyl)phenylmethane, bis(4-hydroxyphenyl) naphthylmethane, bis(4-hydroxyphenyl)-(4-isobutylphenyl) methane, 1,1-bis(4-hydroxyphenyl)ethane, 1-ethyl-1,1-bis (4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl) pentane, 2,2-bis(4-hydroxyphenyl)hexane, 2,2-bis(4-hydroxyphenyl)nonane, 2,2-bis(3-methyl-4-hydroxyphenyl)

propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether [bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol [p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol [bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, 2,6-dihydroxynaphthalene, isosorbide, isomannide, isoidide and combinations thereof, but it is not limited thereto. Among these compounds, the representative ones are 2,2-bis(4-hydroxyphenyl)propane (bisphenol A) and isosorbide. For other functional dihydroxy compounds than the above, U.S. Pat. Nos. 2,999,835; 3,028,365; 3,153,008 and 3,334,154, etc. may be referred to. The dihydroxy compounds may be used alone or in combination of two or more kinds.

Although there is no special limitation, the fluorene ester oligomer may have a viscosity average molecular weight of 1,000 to 8,000. If the viscosity average molecular weight is less than 1,000, it may be difficult to provide improved transmittance. If the viscosity average molecular weight is greater than 8,000, it may be difficult to obtain the polycarbonate copolymer with a high molecular weight due to the decrease of reactivity.

The polycarbonate, which is comprised in the polycarbonate copolymer according to the present invention as a polymerization unit, may have a repeated unit represented by the following formula 2:

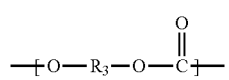

Formula 2

In the above formula 2, $R_3$ represents an alkyl group having 1 to 20 carbons (for example, alkyl group having 1 to 13 carbons), a cycloalkyl group (for example, cycloalkyl group having 3 to 6 carbons), an alkenyl group (for example, alkenyl group having 2 to 13 carbons), an alkoxy group (for example, alkoxy group having 1 to 13 carbons), or an aromatic hydrocarbon group having 6 to 30 carbons which is unsubstituted or substituted with halogen atom or nitro.

The polycarbonate resin used in the preparation of the polycarbonate copolymer may be an oligomeric polycarbonate with a viscosity average molecular weight of, preferably 800 to 20,000, more preferably 800 to 15,000, and most preferably 1,000 to 12,000. If the viscosity average molecular weight of the oligomeric polycarbonate is less than 800, the molecular weight distribution may broaden and the properties may deteriorate. If the viscosity average molecular weight of the oligomeric polycarbonate is greater than 20,000, the reactivity may be lowered.

Although there is no special limitation, the polycarbonate copolymer of the present invention may have a viscosity average molecular weight of 10,000 to 80,000. If the molecular weight is less than 10,000, mechanical properties such as impact strength, tensile strength, etc. may deteriorate. If the molecular weight is greater than 80,000, moldability may deteriorate.

According to the other aspect of the present invention, provided is a method for preparing a polycarbonate copolymer, comprising the steps of: (1) polymerizing a fluorene ester oligomer by reacting a compound having a fluorene backbone selected from dicarboxylic compounds, dihalide compounds, dicyanide compounds and combinations thereof; and a dihydroxy compound; and (2) copolymerizing the fluorene ester oligomer obtained in said step (1) and a polycarbonate in the presence of a first polymerization catalyst.

The compound having a fluorene backbone is selected from dicarboxylic compounds having a fluorene backbone, dihalide compounds having a fluorene backbone, dicyanide compounds having a fluorene backbone, and combinations thereof; and may be represented the following formula 1:

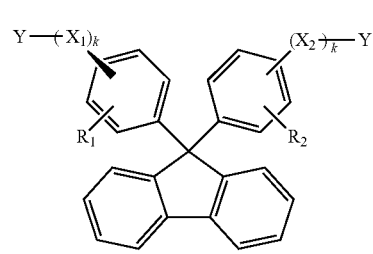

Formula 1 wherein,
each of $R_1$ and $R_2$ is independently hydrogen, an alkyl group having 1 to 30 carbons, a cycloalkyl group having 3 to 30 carbons, or an aryl group having 6 to 30 carbons;
each of $X_1$ and $X_2$ is independently an alkylene group having 1 to 30 carbons, a cycloalkylene group having 3 to 30 carbons, an arylene group having 6 to 30 carbons, or

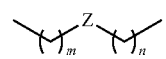

where Z is O, N, S or (C=O), and each of m and n is an integer of 0 to 30;
k is an integer of 0 to 5; and
Y is carboxylic group, acyl group, halogen group, carbonyl halide or isocyano group.

In an embodiment, the oligomeric polycarbonate may be prepared by adding the above-stated dihydroxy compound (for example, bisphenol A) in an aqueous alkali solution to make a phenol salt state, and then adding the phenol in salt state to dichloromethane in which phosgene gas is injected, and reacting them. For the preparation of the oligomer, it is preferable to maintain the molar ratio of phosgene to bisphenol within a range of about 1:1 to 1.5:1, and more preferably about 1:1 to 1.2:1. If the molar ratio of phosgene to bisphenol is less than 1, the reactivity may be lowered. If the molar ratio of phosgene to bisphenol is greater than 1.5, processability may deteriorate due to excessive increase of molecular weight.

The oligomer-forming reaction may generally be conducted at a temperature range of about 15 to 60° C. In order to adjust the pH of the reaction mixture, alkali metal hydroxide (for example, sodium hydroxide) may be used.

The polycarbonate used in the preparation of the polycarbonate copolymer may be an oligomeric polycarbonate with a viscosity average molecular weight of, preferably 800 to 20,000, more preferably 800 to 15,000, and most preferably 1,000 to 12,000. If the viscosity average molecular weight of the oligomeric polycarbonate is less than 800, the molecular weight distribution may broaden and the properties may deteriorate. If the viscosity average molecular weight of the oligomeric polycarbonate is greater than 20,000, the reactivity may be lowered.

In an embodiment, the step of copolymerizing the fluorene ester oligomer obtained in said step (1) and a polycarbonate comprises a step of forming a mixture comprising the fluorene ester oligomer and the polycarbonate, wherein the mixture may comprise a phase transfer catalyst, a molecular weight control agent and a second polymerization catalyst. In addition, said step (2) may comprise: a step of forming a mixture comprising the fluorene ester oligomer and the polycarbonate; and after the completion of the reaction of the fluorene ester oligomer and the polycarbonate, a step of extracting an organic phase from the resulting mixture; wherein said step (2) may comprise a step of providing a first polymerization catalyst to the extracted organic phase.

Concretely, the polycarbonate copolymer of the present invention may be prepared by adding the fluorene ester oligomer to a polycarbonate-containing mixture of organic phase-aqueous phase, and adding thereto stepwise a molecular weight control agent and a polymerization catalyst.

As the molecular weight control agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following formula 3.

(R$_4$)$_4$Q$^+$Y$^-$  [Formula 3]

In the above formula 3, R$_4$ represents an alkyl group having 1 to 10 carbons, Q represents nitrogen or phosphorus, and Y represents halogen atom or —OR$_5$, wherein R$_5$ represents hydrogen atom, an alkyl group having 1 to 18 carbons or an aryl group having 6 to 18 carbons.

Concretely, the phase transfer catalyst may be, for example, [CH$_3$(CH$_2$)$_3$]$_4$NY, [CH$_3$(CH$_2$)$_3$]$_4$PY, [CH$_3$(CH$_2$)$_5$]$_4$NY, [CH$_3$(CH$_2$)$_6$]$_4$NY, [CH$_3$(CH$_2$)$_4$]$_4$NY, CH$_3$[CH$_3$(CH$_2$)$_3$]$_3$NY, CH$_3$[CH$_3$(CH$_2$)$_2$]$_3$NY, wherein Y may be Cl, Br or —OR$_5$ wherein R$_5$ represents hydrogen atom, an alkyl group having 1 to 18 carbons or an aryl group having 6 to 18 carbons. The amount of the phase transfer catalyst used is preferably 0.01% by weight or more in terms of the transparency of the resulting copolymer, but it is not limited thereto.

In an embodiment, after preparing the polycarbonate copolymer, the organic phase dispersed in methylene chloride is washed with alkali and then separated. Subsequently, the organic phase is washed with 0.1 N solution of hydrochloric acid and then rinsed with distilled water 2 or 3 times. After the rinsing is completed, the concentration of the organic phase dispersed in methylene chloride is adjusted constantly and granulation is conducted by using a constant amount of double-distilled water in a rage of 30 to 100° C., and preferably in a rage of 60 to 80° C. If the temperature of the double-distilled water is lower than 30° C., the granulation rate is low and thus the granulation time may be too long. If the temperature of the double-distilled water is higher than 100° C., it may be difficult to obtain polycarbonate with uniform particle size. After the granulation is completed, it is preferable to dry the product at 100 to 120° C. for 5 to 10 hours, and more preferably at 100 to 110° C. for 5 to 10 hours first, and then at 110 to 120° C. for 5 to 10 hours.

Although there is no special limitation, in step (2) the fluorene ester oligomer may be used in an amount of 10 to 50% by weight based on the total weight of reactants to conduct the copolymerization. If the amount of the fluorene ester oligomer used is less than 10% by weight, the effect of high refraction and low double refraction may deteriorate. If the amount of the fluorene ester oligomer used is greater than 50% by weight, the reaction rate and impact strength may be lowered.

The above-explained polycarbonate copolymer of the present invention has the features of high refractive index and low double refraction, and thus it can be used very suitably for applications such as optical material or automotive part.

Therefore, according to another aspect of the present invention, a molded product comprising the polycarbonate copolymer is provided. In the present invention, "molded product" means a molded article using a resin by extrusion, injection, or other processing. Although there is no special limitation, the molded product may be an optical material or an automotive part.

The present invention is explained in more detail through the following Examples and Comparative Examples. However, the scope of the present invention is not limited thereby.

PREPARATION EXAMPLES 1 to 7

Preparation of Fluorene Ester Oligomer

Preparation Example 1

Into a 3-necked 500 mL flask, 9,9-bis-(4-benzoylchloride) fluorene (BBCF) (8.9 g, 20 mmole), bisphenol A (BPA) (6.9 g, 30 mmole) and tetrahydrofuran (200 mL) were fed, trimethylamine (TEA) (20 g) was added thereto slowly under nitrogen atmosphere at 25° C., and the mixture was agitated for 24 hours. After completion of the reaction, the resulting solution was poured into an ice water (1000 mL), and hydrochloric acid (HCl) was added thereto and agitated. The generated precipitate was washed with distilled water and methanol, and dried in a vacuum oven for 24 hours to obtain the fluorene ester oligomer (12.4 g) of the following formula 4:

Formula 4

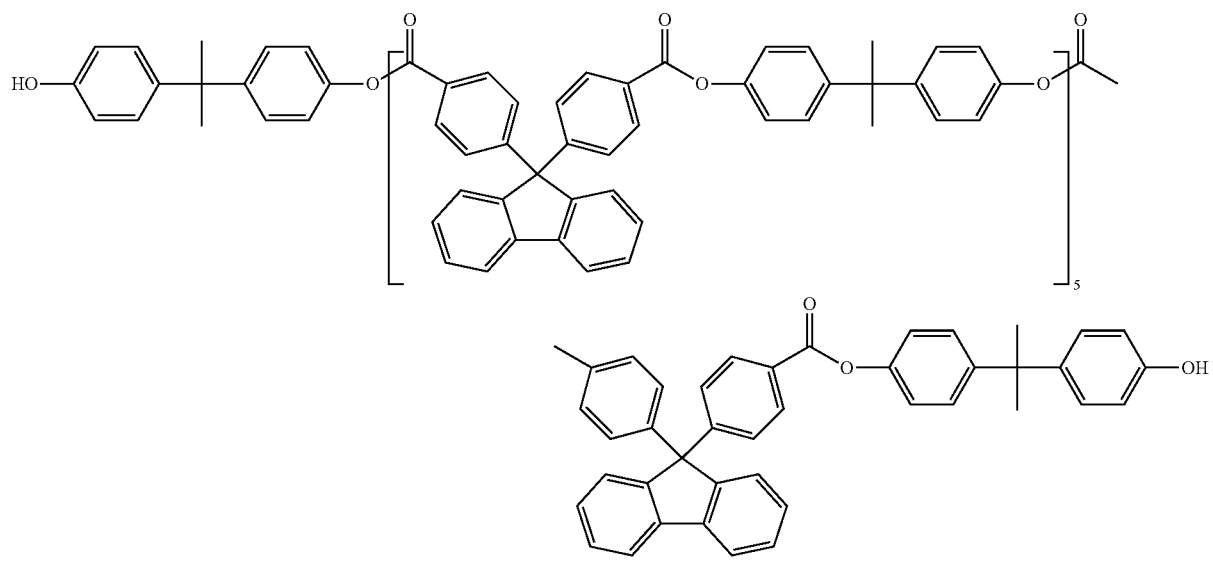

Preparation Example 2

Instead of using BBCF in Preparation Example 1, (9,9-bis-[4-{3-(2-methylphenyl)propanoylchloride}]fluorene (BMPPCF, Hee-Sung Metals) (11.2 g, 20 mmole) was used in the same method of Preparation Example 1 to obtain the fluorene ester oligomer (14.3 g) of the following formula 5:

Formula 5

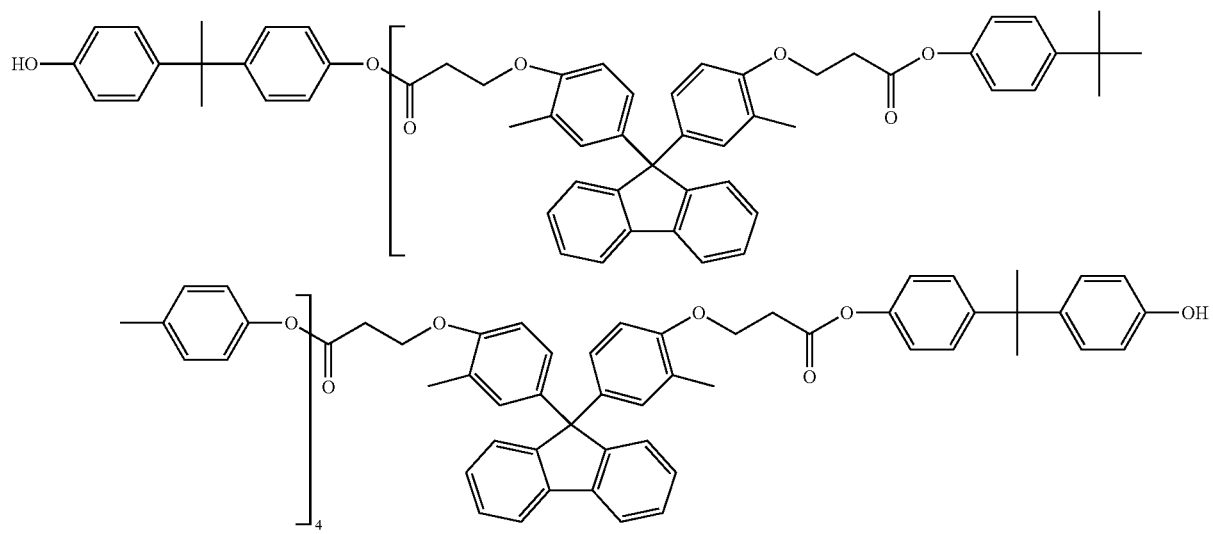

Preparation Example 3

Instead of using BBCF in Preparation Example 1, (9,9-bis[4-(3-phenoxypropanoylchloride)]fluorene (BPPCF) (10.7 g, 20 mmole) was used in the same method of Preparation Example 1 to obtain the fluorene ester oligomer (13.7 g) of the following formula 6:

Formula 6

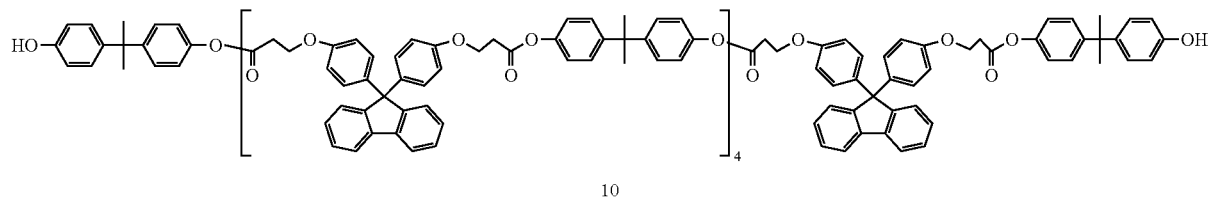

Preparation Example 4

Into a 3-necked 500 mL flask, BPPCF (8 g, 15 mmole), bisphenol A (BPA) (9.2 g, 40 mmole) and tetrahydrofuran (200 mL) were fed, TEA (20 g) was added thereto slowly under nitrogen atmosphere at 25° C., and the mixture was agitated for 12 hours. After completion of the reaction, the resulting solution was poured into an ice water (1000 mL), and hydrochloric acid (HCl) was added thereto and agitated. The generated precipitate was washed with distilled water and methanol, and dried in a vacuum oven for 24 hours to obtain the fluorene ester oligomer (7.2 g) of the following formula 7:

Formula 7

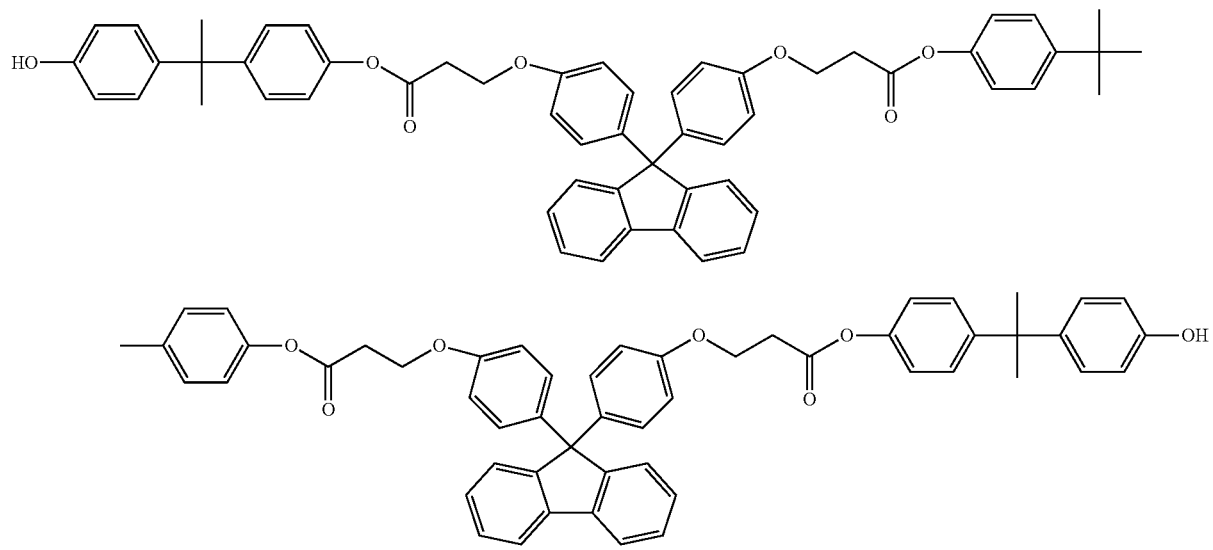

Preparation Example 5

Instead of using BPPCF in Preparation Example 4, (9,9-bis(4-isocyanatobenzene]fluorene (BICBF) (6.1 g, 15 mmole) was used in the same method of Preparation Example 4 to obtain the fluorene-polyurethane oligomer (5.8 g) of the following formula 8:

Preparation Example 6

Instead of using bisphenol A, isosorbide (5.9 g, 40 mmole) was used in the same method of Preparation Example 4 to obtain the fluorene ester oligomer (5 g) of the following formula 9:

Formula 8

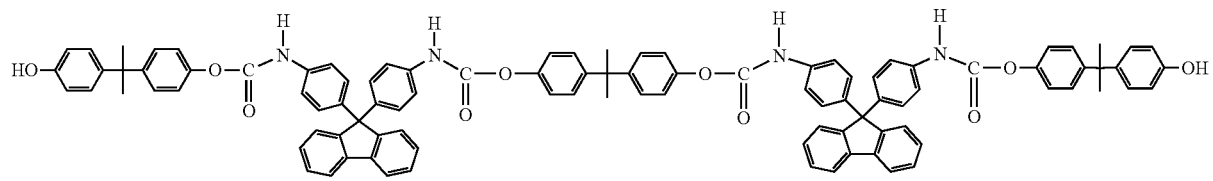

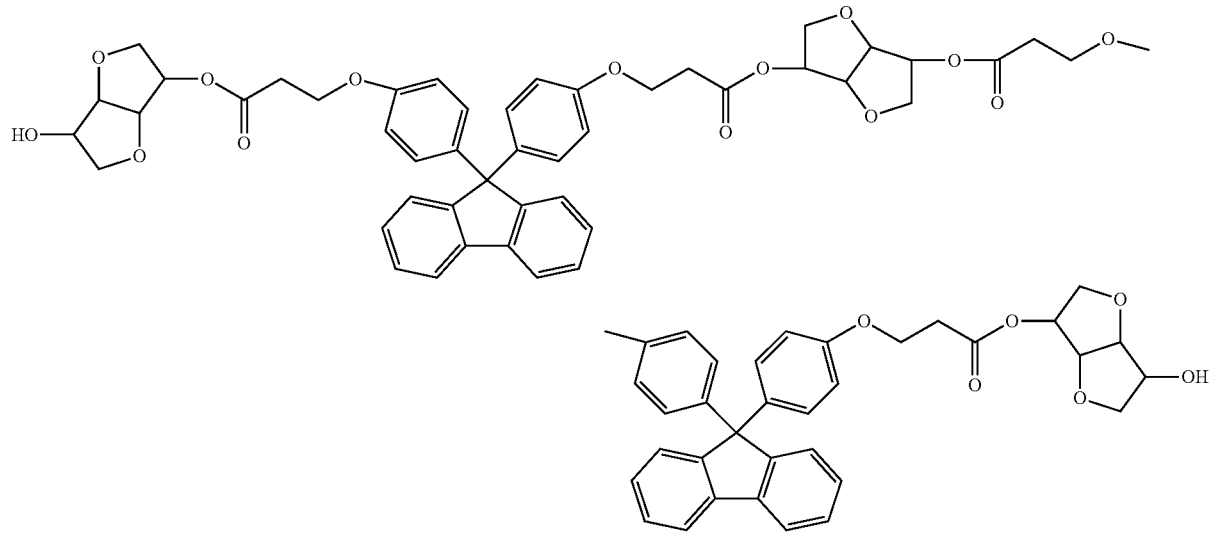

Formula 9

Preparation Example 7

Into a 3-necked 500 mL flask, 9,9-bis-[4-(2-hydroxyethoxy)phenyl]fluorene (BPEF, formula 10) (12.2 g, 30 mmole), terephthaloyl chloride (4.1 g, 20 mmole) and tetrahydrofuran (200 mL) were fed, TEA (20 g) was added thereto slowly under nitrogen atmosphere at 25° C., and the mixture was agitated for 24 hours. After completion of the reaction, the resulting solution was poured into an ice water (1000 mL), and hydrochloric acid (HCl) was added thereto and agitated. The generated precipitate was washed with distilled water and methanol, and dried in a vacuum oven for 24 hours to obtain the fluorene ester oligomer (13.4 g) of the following formula 11:

weight), tetrabutyl ammonium chloride (TBACl) (1.8 mL), p-tert-butylphenol (PTBP) (2.68 g) and trimethylamine (TEA) (15 wt % aqueous solution) (275 μL) were admixed, and then reacted for 30 minutes. The oligomeric polycarbonate mixture after reaction was then phase-separated, and only the organic phase was collected and mixed with an aqueous solution of sodium hydroxide (170 g), methylene chloride (360 g) and trimethylamine (15 wt % aqueous solution) (300 μL), and then reacted for 2 hours. The viscosity-increased mixture was washed with alkali, and only the organic phase was collected therefrom and washed with 0.1 N hydrochloric acid solution, and then rinsed with distilled water 2 or 3 times repeatedly. After the rinse was completed, the organic phase was granulated by using a

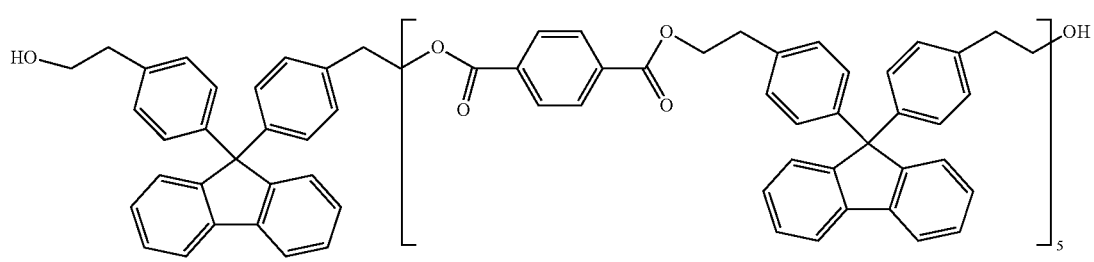

Formula 11

EXAMPLES 1 to 8

Preparation of Polycarbonate Copolymer

Example 1

Bisphenol A in an aqueous solution and phosgene gas (CDC) were interfacially reacted in the presence of methylene chloride to prepare an oligomeric polycarbonate mixture (400 mL) with a viscosity average molecular weight of about 1,000. To the obtained oligomeric polycarbonate mixture, the fluorene ester oligomer of Preparation Example 1 (formula 4) dissolved in methylene chloride (20% by constant amount of double-distilled water at 76° C. After the granulation was completed, the product was dried first at 110° C. for 8 hours and then at 120° C. for 10 hours, to produce a polycarbonate copolymer.

Example 2

A polycarbonate copolymer was produced by the same method as Example 1, excepting that the fluorene ester oligomer of Preparation Example 2 (formula 5) (20% by weight) was used instead of the fluorene ester oligomer of Preparation Example 1.

Example 3

A polycarbonate copolymer was produced by the same method as Example 1, excepting that the fluorene ester oligomer of Preparation Example 3 (formula 6) (20% by weight) was used instead of the fluorene ester oligomer of Preparation Example 1.

Example 4

A polycarbonate copolymer was produced by the same method as Example 3, excepting that the fluorene ester oligomer of Preparation Example 3 (formula 6) (40% by weight) was used.

Example 5

A polycarbonate copolymer was produced by the same method as Example 3, excepting that p-tert-butylphenol (PTBP) (1.02 g) was fed.

Example 6

A polycarbonate copolymer was produced by the same method as Example 1, excepting that the fluorene ester oligomer of Preparation Example 4 (formula 7) (20% by weight) was used instead of the fluorene ester oligomer of Preparation Example 1.

Example 7

A polycarbonate copolymer was produced by the same method as Example 1, excepting that the fluorene-polyurethane oligomer of Preparation Example 5 (formula 8) (20% by weight) was used instead of the fluorene ester oligomer of Preparation Example 1.

Example 8

A polycarbonate copolymer was produced by the same method as Example 1, excepting that the fluorene ester oligomer of Preparation Example 6 (formula 9) (20% by weight) was used instead of the fluorene ester oligomer of Preparation Example 1.

COMPARATIVE EXAMPLES 1 and 2

Comparative Example 1

Bisphenol A in an aqueous solution and phosgene gas (CDC) were interfacially reacted in the presence of methylene chloride (MC) to prepare an oligomeric polycarbonate mixture (400 mL) with a viscosity average molecular weight of about 1,000. To the obtained oligomeric polycarbonate mixture, 9,9-bis-[4-(2-hydroxyethoxy)phenyl]fluorene of the following formula 10 dissolved in methylene chloride (20% by weight), tetrabutyl ammonium chloride (TBACl) (1.8 mL), p-tert-butylphenol (PTBP) (2.68 g) and trimethylamine (TEA) (15 wt % aqueous solution) (275 µL) were admixed, and then reacted for 30 minutes. The oligomeric polycarbonate mixture after reaction was then phase-separated, and only the organic phase was collected and mixed with an aqueous solution of sodium hydroxide (170 g), methylene chloride (360 g) and trimethylamine (15 wt % aqueous solution) (300 µL), and then reacted for 2 hours. The viscosity-increased mixture was washed with alkali, and only the organic phase was collected therefrom and washed with 0.1 N hydrochloric acid solution, and then rinsed with distilled water 2 or 3 times repeatedly. After the rinse was completed, the organic phase was granulated by using a constant amount of double-distilled water at 76° C. After the granulation was completed, the product was dried first at 110° C. for 8 hours and then at 120° C. for 10 hours, to produce a polycarbonate copolymer.

Formula 10

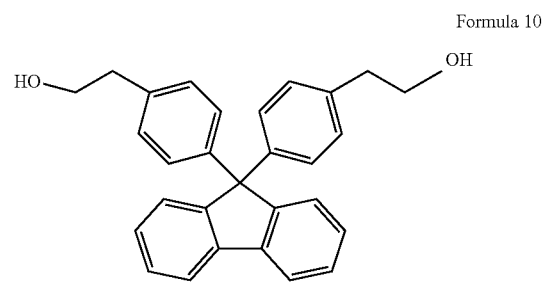

Comparative Example 2

A polycarbonate copolymer was produced by the same method as Comparative Example 1, excepting that the fluorene ester oligomer of Preparation Example 7 (formula 11) (20% by weight) was used instead of 9,9-bis-[4-(2-hydroxyethoxy)phenyl]fluorene of Comparative Example 1.

The properties of the compounds produced in the above Examples and Comparative Examples were shown in the following Table 1. The methods for evaluating the properties of the polycarbonate copolymers produced in the above Examples and Comparative Examples are as follows.

$^1$H-NMR (nuclear magnetic resonance spectroscopy): This analysis was conducted by using Avance DRX 300 (Bruker).

Viscosity average molecular weight (Mv): The viscosity of methylene chloride solution was measured by using an Ubbelohde Viscometer at 20° C., and the limiting viscosity [η] therefrom was calculated according to the following equation:

$$[\eta]=1.23\times10^{-5} \text{ Mv}^{0.83}$$

(c) Impact strength: The impact strength was measured using RESIL IMPACTOR (CEAST) at room temperature and −60° C.

(d) Transmittance: The transmittance was measured an Haze meter, HAZE-GARD PLUS (BYK GARDNER).

TABLE 1

| Properties | Examples | | | | | | | | Comparative Examples | |
|---|---|---|---|---|---|---|---|---|---|---|
| | 1 | 2 | 3 | 4 | 5 | 6 | 7 | 8 | 1 | 2 |
| Molecular weight (Mv) | 20100 | 21100 | 21300 | 20500 | 45200 | 20400 | 20100 | 20300 | 15300 | 17400 |

TABLE 1-continued

| Properties | Examples | | | | | | | | Comparative Examples | |
|---|---|---|---|---|---|---|---|---|---|---|
| | 1 | 2 | 3 | 4 | 5 | 6 | 7 | 8 | 1 | 2 |
| Impact strength (Kgfcm/cm$^2$) | 15 | 27 | 31 | 15 | 38 | 19 | 23 | 17 | 5 | 9 |
| Transmittance (%) | 90 | 91 | 91 | 92 | 91 | 91 | 90 | 91 | 89 | 89 |

From Table 1 above, it can be known that, as compared with Comparative Examples 1 and 2, the polycarbonate copolymers Examples 1 to 8 produced by using the fluorene ester oligomers of Preparation Examples 1 to 6, respectively, have higher molecular weights, and show better transmittance and impact strength. Therefore, the polycarbonate copolymer of the present invention can be used very suitably for applications such as optical material, automotive part, etc.

What is claimed is:

1. A polycarbonate copolymer comprising, as polymerization units,
   a fluorene ester oligomer prepared from: a compound having a fluorene backbone selected from dicarboxylic compounds, dihalide compounds, dicyanide compounds and combinations thereof; and a dihydroxy compound; and
   a polycarbonate.

2. The polycarbonate copolymer according to claim 1, wherein the compound having a fluorene backbone is represented by the following formula 1:

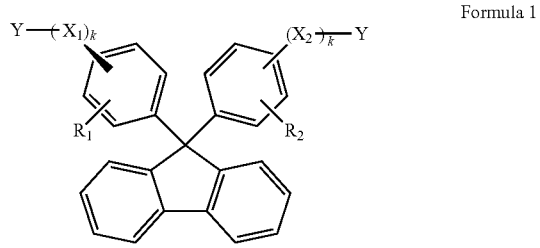

Formula 1 wherein,
each of $R_1$ and $R_2$ is independently hydrogen, an alkyl group having 1 to 30 carbons, a cycloalkyl group having 3 to 30 carbons, or an aryl group having 6 to 30 carbons;
each of $X_1$ and $X_2$ is independently an alkylene group having 1 to 30 carbons, a cycloalkylene group having 3 to 30 carbons, an arylene group having 6 to 30 carbons, or

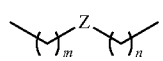

where Z is O, N, S or (C=O), and each of m and n is an integer of 0 to 30;
k is an integer of 0 to 5; and
Y is carboxylic group, acyl group, halogen group, carbonyl halide or isocyano group.

3. The polycarbonate copolymer according to claim 1, wherein the dihydroxy compound is selected from the group consisting of bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxypheny)pethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether [bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol [p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol [bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3, 3', 5, 5'-tetramethyl-4,4'-dihydroxybenzophenone, 4,4'-dihydroxy diphenyl, methylhydroquinone, 1,5-dihydroxynaphthalene, 2,6-dihydroxynaphthalene, isosorbide, isomannide, isoidide and combinations thereof.

4. The polycarbonate copolymer according to claim 1, wherein the fluorene ester oligomer has a viscosity average molecular weight of 1,000 to 8,000.

5. The polycarbonate copolymer according to claim 1, wherein the copolymer has a viscosity average molecular weight of 10,000 to 80,000.

6. A method for preparing a polycarbonate copolymer, comprising the steps of:

(1) polymerizing a fluorene ester oligomer by reacting a compound having a fluorene backbone selected from dicarboxylic compounds, dihalide compounds, dicyanide compounds and combinations thereof; and a dihydroxy compound; and (2) copolymerizing the fluorene ester oligomer obtained in said step (1) and a polycarbonate in the presence of a first polymerization catalyst.

7. The method for preparing a polycarbonate copolymer according to claim 6, wherein the compound having a fluorene backbone is represented by the following formula 1:

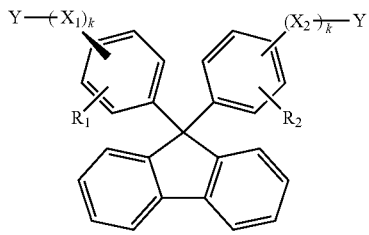

Formula 1 wherein, each of $R_1$ and $R_2$ is independently hydrogen, an alkyl group having 1 to 30 carbons, a cycloalkyl group having 3 to 30 carbons, or an aryl group having 6 to 30 carbons;

each of $X_1$ and $X_2$ is independently an alkylene group having 1 to 30 carbons, a cycloalkylene group having 3 to 30 carbons, an arylene group having 6 to 30 carbons, or

where Z is O, N, S or (C=O), and each of m and n is an integer of 0 to 30;

k is an integer of 0 to 5; and

Y is carboxylic group, acyl group, halogen group, carbonyl halide or isocyano group.

8. The method for preparing a polycarbonate copolymer according to claim 6, wherein in step (2), the fluorene ester oligomer is used in an amount of 10 to 50% by weight based on the total weight of reactants.

9. A molded product comprising the polycarbonate copolymer of claim 1.

10. The molded product according to claim 9, which is an optical material or an automotive part.

* * * * *